UNITED STATES PATENT OFFICE.

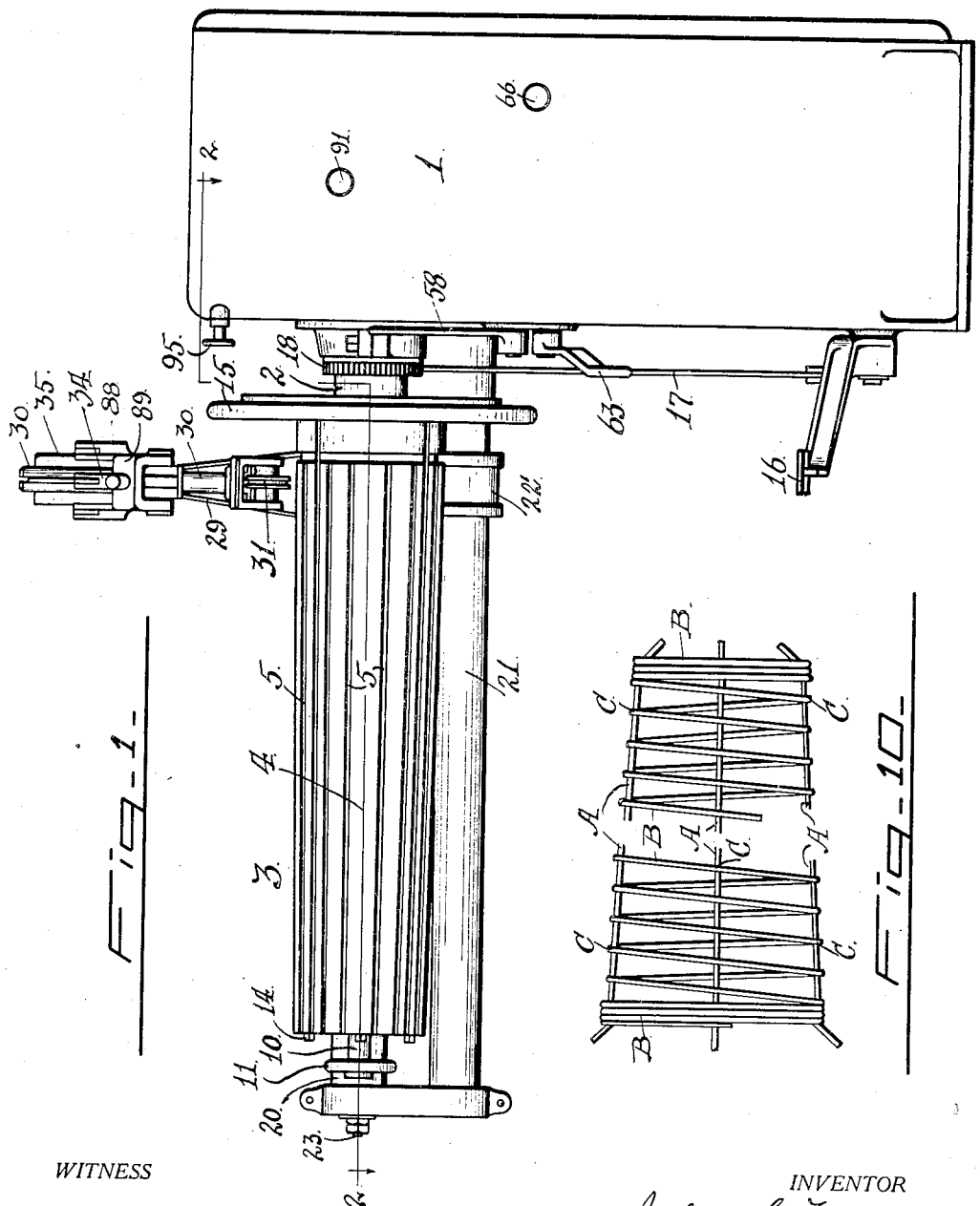

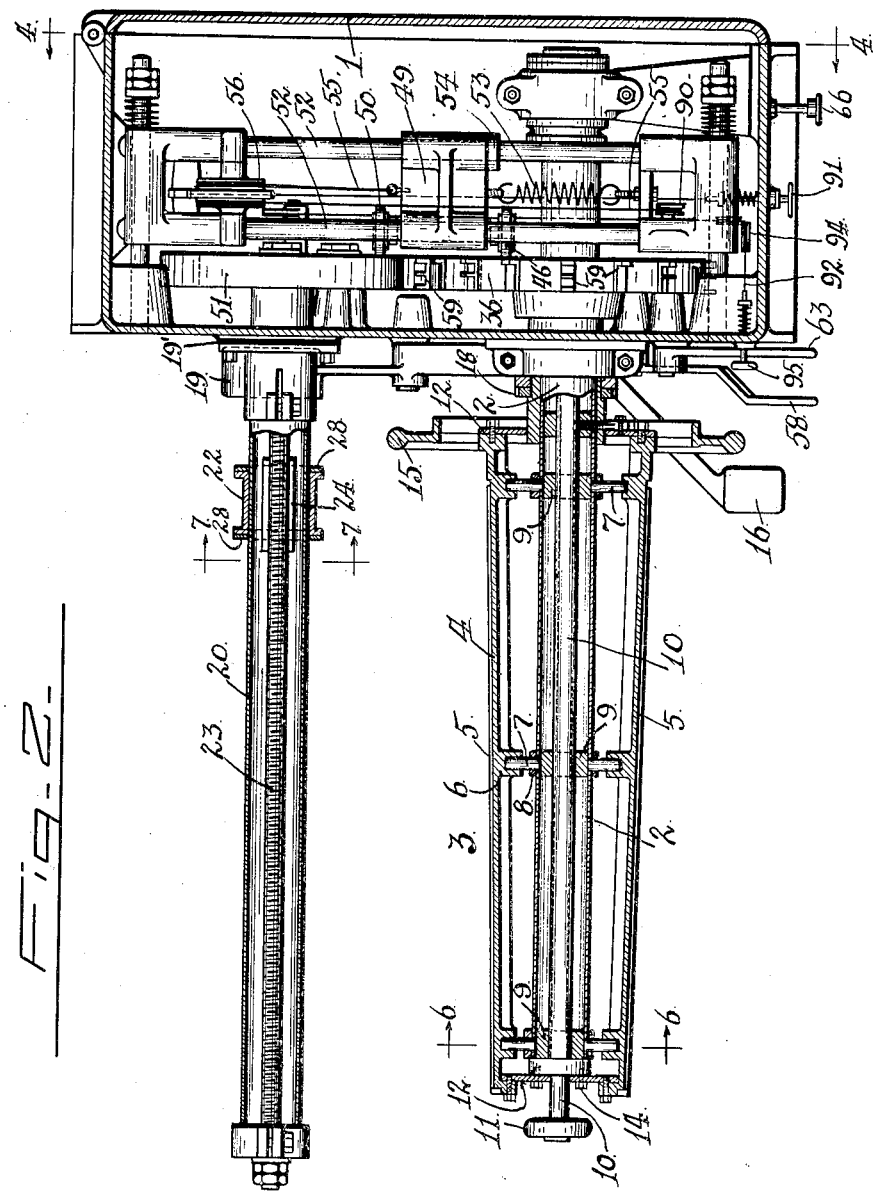

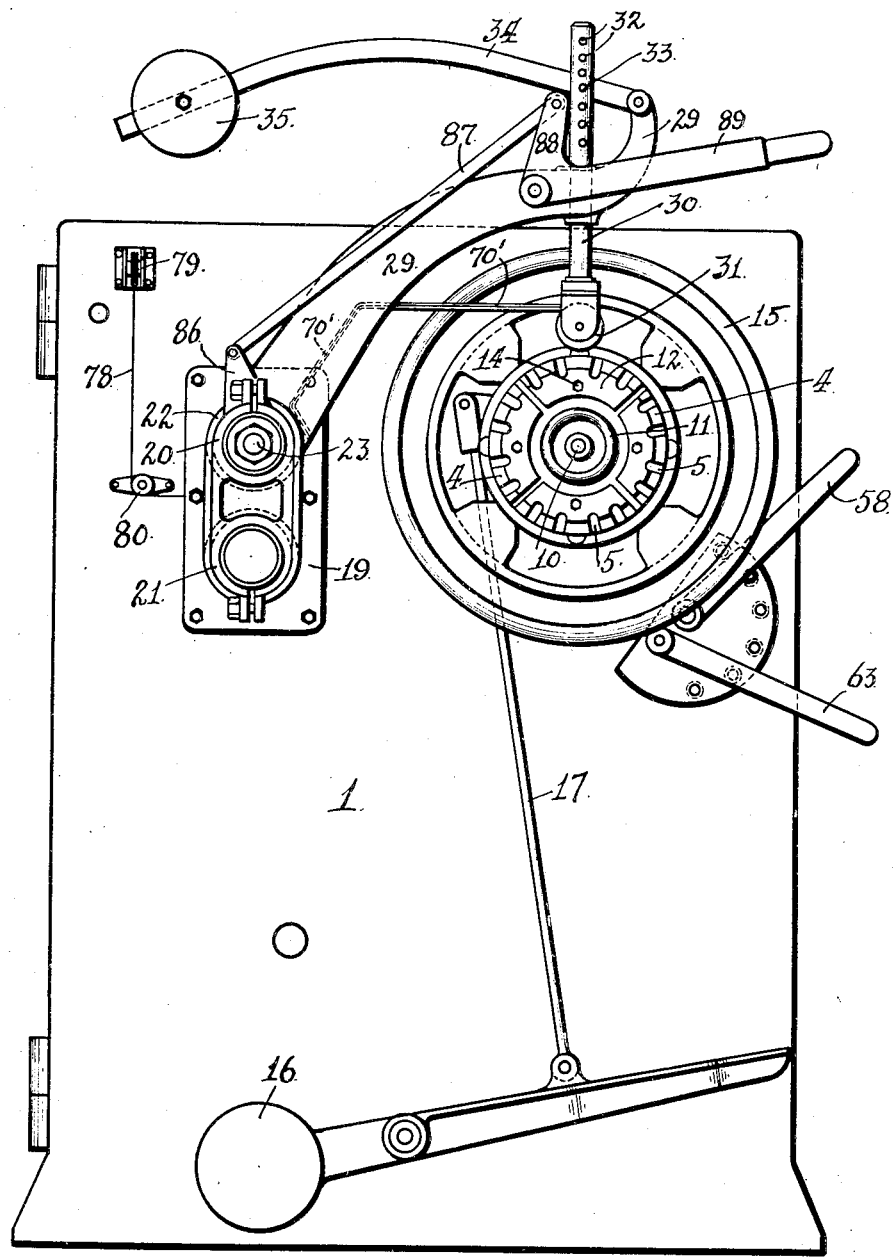

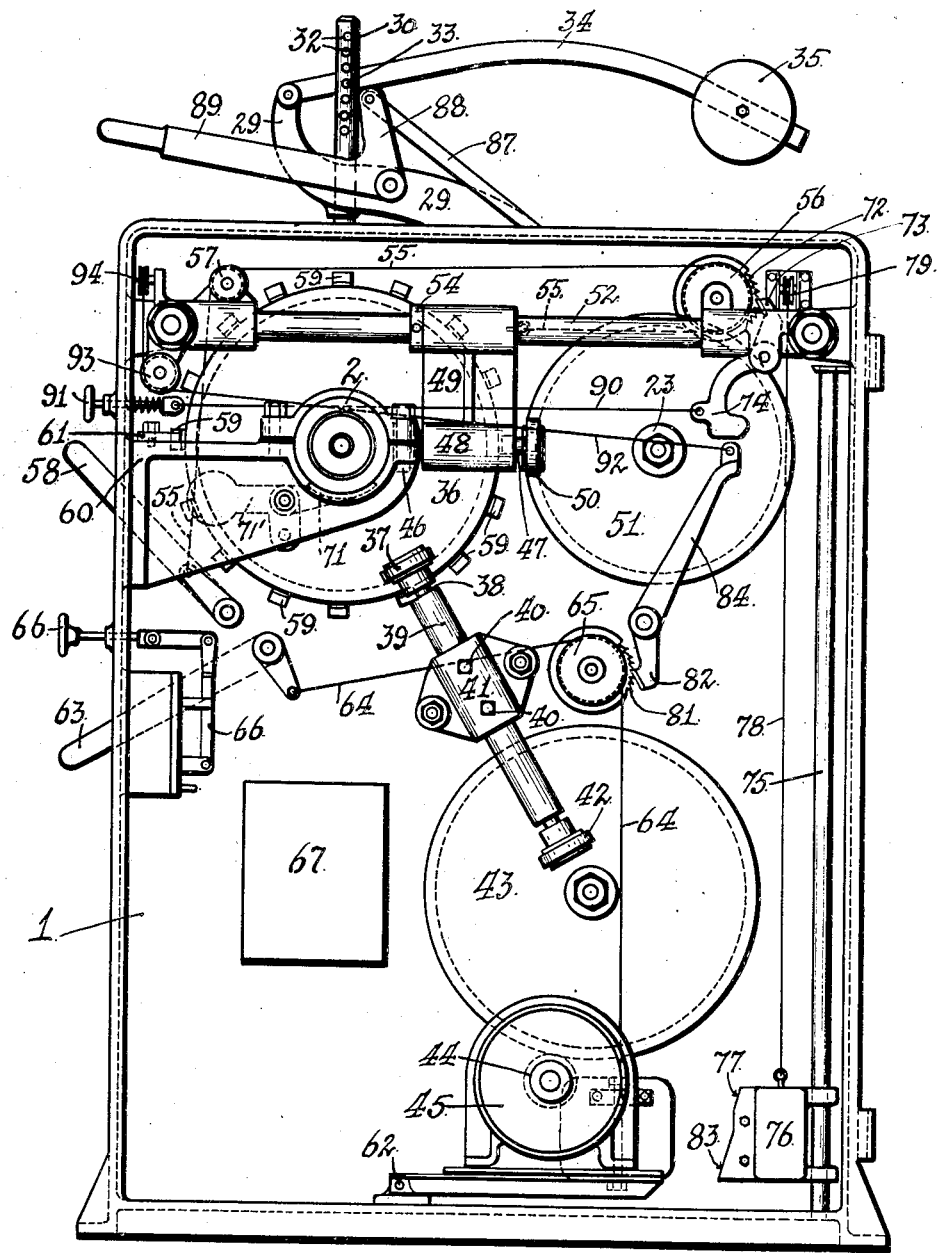

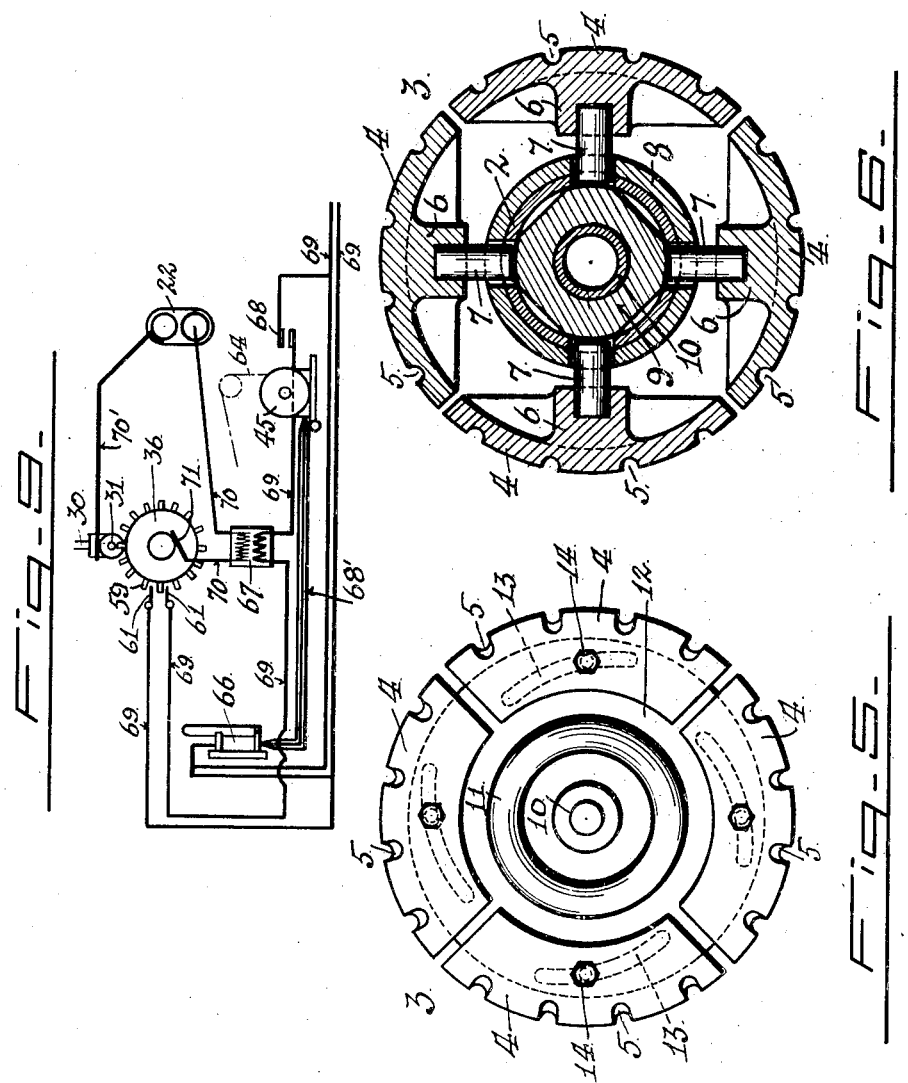

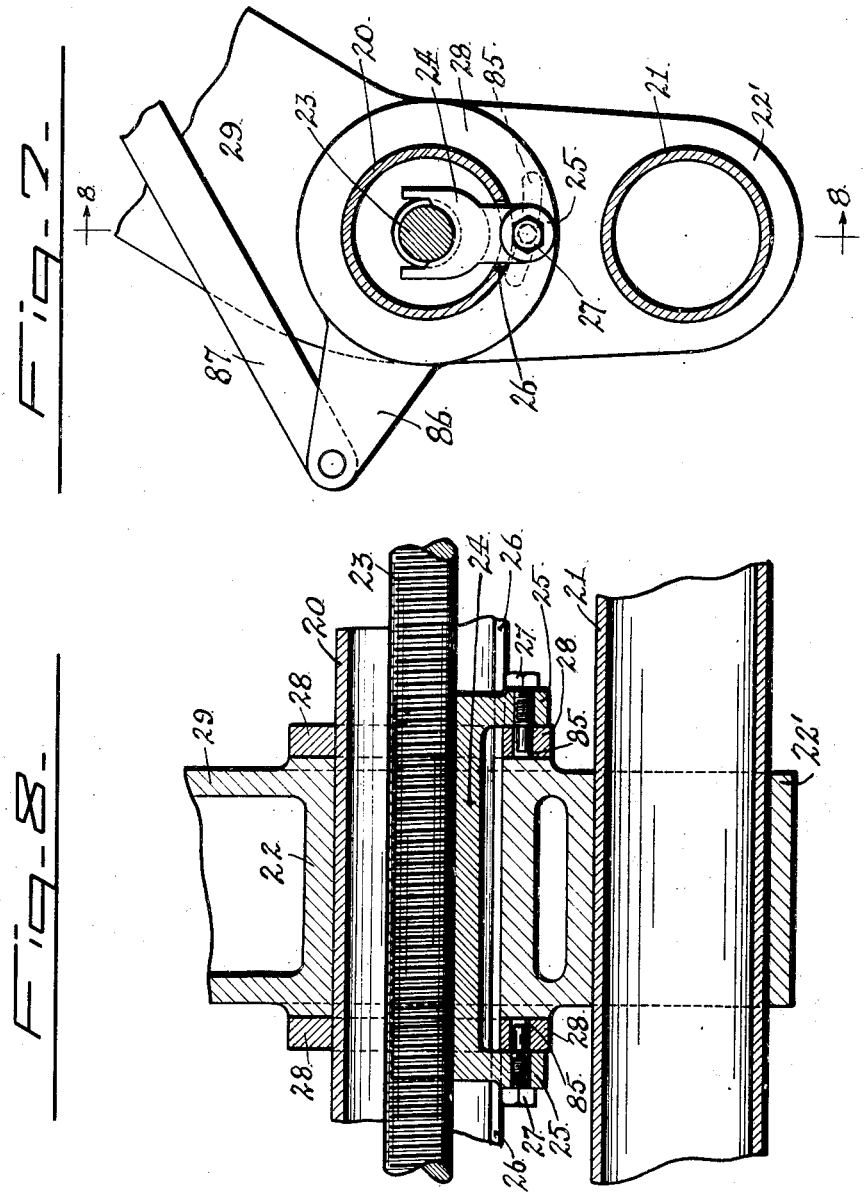

JULIUS G. ZWICKER, OF BERKELEY, CALIFORNIA.

WIRE-COIL-MAKING MACHINE.

1,365,015.  Specification of Letters Patent.  Patented Jan. 11, 1921.

Application filed May 21, 1919. Serial No. 298,648.

*To all whom it may concern:*

Be it known that I, JULIUS G. ZWICKER, a citizen of the United States, residing at Berkeley, in the county of Alameda and State of California, have invented certain new and useful Improvements in Wire-Coil-Making Machines, of which the following is a specification.

My invention relates to machines for making wire-coils; and it especially concerns a machine for making a wire-coil comprising a circumferential series of longitudinal wires and a circumferential wire wound helically around the longitudinal wires, and secured thereto at each crossing by spot-welding.

Such a coil finds use as reinforcing for tubular concrete articles, as, for example, concrete-pipe sections. A coil of this nature and for this purpose is fully disclosed in the United States patent granted to me May 28, 1918, No. 1,267,835, and reference may be had to said patent in connection herewith, though, for greater clearness in understanding the functions and operation of the present machine, I have in the accompanying drawings illustrated said coil.

The object of my invention is to provide an effective machine to make such wire coils, and to this end my invention consists in the novel machine which I shall now fully describe and claim:

In the accompanying drawings—

Figure 1 is a front elevation of my machine.

Fig. 2 is a longitudinal horizontal section on the line 2—2 of Fig. 1.

Fig. 3 is an end elevation.

Fig. 4 is a section on the line 4—4 of Fig. 2.

Fig. 5 is an end view of the mandrel.

Fig. 6 is a section, enlarged, of the mandrel, on the line 6—6 of Fig. 2.

Fig. 7 is a section, enlarged, of the traveler mechanism on the line 7—7 of Fig. 2.

Fig. 8 is a section of same on the line 8—8 of Fig. 7.

Fig. 9 is the wiring diagram.

Fig. 10 is an elevation of the wire-coil product of the machine.

Before describing the machine, it will be of advantage to refer to the wire-coil which the machine is intended to make.

In Fig. 10 this coil is shown. It comprises longitudinal wires A and a circumferential wire B, helically wound upon the longitudinal wires and secured thereto at each crossing C by spot welding.

The coil may have any number of longitudinal wires, the one here indicated having four, only three being shown in the elevation.

1 is a housing frame, in which is mounted a hollow mandrel-shaft 2, which carries the mandrel or former 3. The mandrel, as shown in Figs. 1 and 2, tapers from its inner to its outer end, and is composed of a plurality of spaced arcuate segments 4, as in Figs. 5 and 6. Each segment has on its outer face longitudinal grooves 5, and on its inner face bosses 6, in which are fitted studs 7 the inner ends of which play through holes in guide collars 8 on the shaft 2 and through holes in the said shaft, and are exposed to the contact of cams 9 carried by a rod 10 mounted for rotation within the hollow shaft 2.

A hand wheel 11 on the outer end of the cam-rod 10 is used to rotate the rod. The ends of the mandrel segments 4 are fitted to heads 12, in which as shown in Fig. 5 are slots 13, with bolts 14 playing therein.

It will now be seen that by rotating the rod 10, its cams 9, through the studs 7 will force the segments 4 apart and thereby expansively adjust the diameter of the mandrel to make the desired size of coil; or the segments may be removed and others of different size substituted.

The mandrel carries at its inner end a hand-wheel 15 to effect its manual rotation when initially placing the longitudinal wires A of the coil in the grooves 5, as will be hereinafter described, or this initial rotation may be effected through a pedal 16, Figs. 1, 2 and 3, connecting link pawl 17 and ratchet 18, Fig. 1.

Extending from a bracket 19 bolted to the inner face of the housing frame 1 is a fixed rail composed of an upper tubular member 20 and a lower member 21. Figs. 1 and 3. Upon the upper rail member 20 is fitted a sliding traveler 22, Figs. 2 and 8, said traveler having, as seen in Figs. 7 and 8, a foot piece 22' which slides upon the lower rail member 21 to steady the movement.

Within the tubular upper rail member 20 is a feed screw 23, which, as seen in Figs. 7 and 8, engages a feed nut 24, having arms 25 which play through a slot 26 in the bottom of the upper rail-member 20, said arms being adjustably secured by bolts 27 to the slotted end collars 28 of the traveler, Fig. 7, for the purpose, as hereinafter described of throwing the nut into and out of engagement with the screw. Thus when the feed screw 23 is rotated, it will, through the nut 24 effect the movement of the traveler 22 along the rails 20 and 21.

Carried by the traveler 22 is a bracket 29 which projects over toward the mandrel as seen in Fig. 3, and in said bracket is carried a vertically slidable stem 30 the lower end of which carries, directly above the vertical diameter of the mandrel the grooved roll 31 Figs. 1 and 3. This roll serves the double function of a wire guide and a spot-welder, as will be hereinafter described. The stem 30 of the welder guide-roll 31 is provided with a vertical series of holes 32, Figs. 3 and 4 to receive a pin 33, and through the stem, which is slotted as in Fig. 1, passes the arm 34 carrying a weight 35. The other extremity of the arm 34 is pivoted to the extremity of the bracket 29 and said arm 34 is connected with the stem 30 by the pin 33 and thereby serves to normally yieldingly hold the roll 31 down to its work. By setting the pin in other holes the normal vertical position of the roll 31 may be regulated for various expansions or different sizes of the mandrel.

The mandrel shaft 2 is driven by a gear 36 upon its end, within the housing frame 1, Figs. 2 and 4. The gear 36 is a friction-disk gear and receives its motion, (Fig. 4) from a friction pinion 37 on one end of a shaft 38, mounted within a bushing 39 adjustably carried by set screws 40 in a bearing 41. The other end of the shaft 38 carries another friction pinion 42, which engages the face of a large idler friction gear 43, which is itself frictionally engaged by the pinion 44 of an electric motor 45.

The feed screw 23 for effecting the movement of the traveler 22 and consequent movement of the guide roll 31, is driven from the friction gear 36 of the mandrel shaft, through a friction pinion 46 (Fig. 4) on a shaft 47 mounted in a bushing 48 carried by a sliding bracket 49. The other end of the shaft 47 has a friction pinion 50 which engages the face of a friction disk gear 51 fixed on the inner end of the feed screw 23.

Concerning these friction drives, it will be seen that the speed of the motor is properly reduced to suit the requirements of the relatively slow revolution of the mandrel, and this rate of revolution may be varied by longitudinally adjusting the bushing 39 to alter the relative positions of the pinions 37 and 42 on the faces of their respective gears 36 and 43. In like manner the rate of revolution of the feed screw 23 and the rate of travel of the guide roll 31, the latter determining and controlling the pitch of the wire helix, may be varied by sliding the bracket 49, to vary the relative positions of the pinions 46 and 50 on their respective gears 36 and 51. The adjustment and control of the bracket 49 will be seen by reference to Figs. 2 and 4. The bracket is slidably carried upon a rail frame 52 and is held by a spring 53, Fig. 2 in initial position against a collar 54. In this position as seen in Fig. 4, the drive of the friction gear 51 and consequent travel of the guide roll 31 is the slowest. Secured to the other side of the bracket 49 is a line 55 which passes around a pulley 56, thence to a pulley 57, Fig. 4 and down to a lever 58. By depressing the lever 58, the bracket 49 is moved to the right, in Fig. 4, thereby changing the positions of the friction pinions 46 and 50 with the effect of driving the feed screw 23 faster and causing the guide roll 31 to travel faster.

It will be well at this point to describe the operation of the machine as thus far disclosed.

The longitudinal wires A of the coil shown in Fig. 10, which coil is the product to be made on the machine, are laid, in such number as may be predetermined, in the grooves 5 of the mandrel 4, the diameter of the mandrel itself having been previously determined and fixed for the size of coil desired. In laying in these longitudinal wires upon the mandrel, the latter may be conveniently turned manually through the hand-wheel 15, or by the foot, through the pedal 16.

The helix wire B of the coil, drawn from any conveniently situated roll and under proper tension, is now led in and passed under the guide roll 31, which is then, as shown in Fig. 1, at the head end of the mandrel. In this position the end of the helix or circumferential wire is suitably fastened to and upon one of the longitudinal wires. The machine is now started and while the friction pinions 46 and 50 are in the position shown in Fig. 4 by which the slowest travel of the guide roll 31 is produced, a few revolutions, say three, are made, with the result of laying up the turns of the helix wire around the mandrel and upon the longitudinal wires, very close together, in order to give strength to the end of the wire coil being made. Then, by depressing lever 58 the friction pinions 46 and 50 are changed in position, to impart such increased rate of travel to the guide roll 31, as may be predetermined for the pitch of the helix. This motion continues uniform until near the outer end of the mandrel when by releasing the lever 58, the spring 53 will return the pinions 46 and 50 to their initial position, thereby reducing the rate of travel of the guide roll 31, with the effect of laying up several turns, say three, of the helix wire close together to strengthen that end of the coil.

The helix or circumferential wire, in thus being laid up crosses and lies upon each of the longitudinal wires, and in order to secure the wires at each crossing, I have provided for their electric welding, using the guide roll 31 as a spot-welding agency. Accordingly I provide a suitable electric circuit, to be presently described, which when closed includes said roll and the mandrel and the intervening wires, and I control said circuit in such manner that it is normally open, but is closed at the moment of each crossing of the longitudinal wires by the helix wire lying in the roll, whereby a spot weld is effected. This control or make and break of the circuit is effected by a switch as follows:—On the rim of the mandrel-shaft-gear 36 are carried the series of circumferentially placed contacts 59, Figs. 2 and 4, and on a bracket 60 of the housing frame is placed the other contact 61. The engagement of these contacts 59 and 61 is so timed, by their position, that the circuit is closed at each crossing of the wires and the spot-weld made.

It will be seen from Figs. 5 and 6 that I show 16 grooves in the mandrel to accommodate a maximum number of longitudinal wires. To provide for the spot-welding of this number of wires, I have sixteen contacts 59 on the gear 36, as shown in Fig. 4. But for smaller coils I will not use 16 longitudinal wires, but will use, say, eight, or four, for example. To provide for these various multiples, it will be seen by reference to Fig. 2 that the contacts 59 on the gear 36 are in three circumferential sets, one, that shown on the right representing 16 contacts around the gear, the one on the left representing four contacts around the gear, and the one in the middle representing eight contacts. To accommodate each of these sets, I make the other contact 61 adjustable in such manner, as indicated in Fig. 4 that it may be set to engage the 16 set of contacts 59, or the eight set, or the four set, according to the number of longitudinal wires laid in the mandrel.

Referring to Fig. 4, the frame of the motor 45 is pivoted at 62, and the motor is normally out of circuit, but is thrown into circuit by lifting it. To effect this, there is an angle lever 63, which is connected with the motor by a line 64 passing over a pulley 65. At 66 in Fig. 4 is represented the main switch by which current is turned into the motor, and at 67 is indicated a step up transformer. The wiring diagram of Fig. 9 will now be understood. The main switch 66 turns the current into the motor 45 through the three line circuit 68'. The motor 45 when lifted by the line 64 closes at 68 the primary circuit 69 and the current then passing through the primary of the transformer 67 leads to the welding switch 61—59 and thence returns. This primary circuit at the transformer 67 induces a secondary or welding circuit 70, through a brush 71 on the mandrel shaft, said brush as seen in Fig. 4 being held to the shaft by a weighted arm 71'. Said secondary or welding circuit 70 also leads through the traveler 22 from which through the brush 70' (seen also in Fig. 3) the current is led to the welding-guide-roll 31. As seen in Fig. 2, the bracket 19, which carries the guide 20 of the traveler 22 is insulated at 19'.

Thus when the primary circuit is closed at the switch 61—59, the welding circuit is established through the mandrel and the guide roll to spot-weld the intervening wires of the coil. It has been heretofore stated that after the first relatively slow travel of the guide roll 31, in order to make a few close together coils of the helix, the travel of said roll is accelerated by pulling down the lever 58, in order, through the line 55 to change the ratios of the friction gears which effect the travel of said roll, and that near the end of the operation, the slower speed is again restored. Now, in order to provide for these operations, I associate with the pulley 56 which controls the line 55, a ratchet 72 (Fig. 4) with which a retaining pawl 73 engages. When the lever 58 is depressed to accelerate the travel of the roll 31, the pawl and ratchet 73—72 holds the pulley 56 and line 55 to maintain this rate of travel, but when the pawl is released, the spring 53 (Fig. 2) will restore the slower travel. In order to effect this release, near the end of the travel, the pawl is automatically tripped as follows: The said pawl 73 has a trigger arm 74 (Fig. 4). Upon a vertical guide 75, slides a weight 76, which has a cam face 77, adapted when it reaches the trigger arm 74 to disengage said pawl 73 and thus allow the spring 53 to act, to restore the slower speed and make the few close turns at the smaller end of the wire coil. The weight 76 is raised by a line 78, which passes up to a pulley 79, Figs. 4 and 3, and thence extends down outside the housing frame, as seen in Fig. 3, to a pulley 80, and thence to the traveler 22 to which it is attached. Therefore, as the traveler 22 moves forward, the weight 76 rises, and when its cam 77 reaches the trigger arm 74 it releases the pawl and line 55 and allows the spring 53 to restore the slower speed; and this operation is timed to produce the close-together turns of the helix at the small end of the coil.

When the end is reached, the motor 45 is thrown out of action as follows: Referring again to Fig. 4, there is associated with the pulley 65 which controls the lifting line 64 of the motor, a ratchet 81, with which a pawl 82 engages. When the lever 63 is depressed, to lift the motor to throw it into circuit as heretofore explained, this position is maintained by the ratchet and pawl 81—82. But at the end of the operation after the last close-together coils are made, a second cam 83 on the weight 76 contacts with a trigger arm 84 of the pawl 82 and disengages said pawl, whereupon the motor drops down and shuts off the current by breaking the circuit at 68 Fig. 9.

Now, in order to start and stop the movement of the traveler 22 and the guide roll 31 which it carries, provision is made to throw the nut 24 into engagement with the feed-screw 23 at the beginning of the operation and to throw it out at the end of its travel. Referring to Figs. 7 and 8 it will be seen that the arms 25 of the nut 24 are secured to the end collars 28, by the screws or bolts 27, and that these latter play in cam slots 85 in the collars. Secured to these collars is a crank arm 86, from which extends a link 87 (Fig. 7) to the short arm 88 of an angle lever 89, Figs. 3 and 4. By lifting the lever 89, the collars 28 are turned so that their cam-slots 85 lift the nut 24 into engagement with the screw 23, and by depressing said lever the nut is drawn down from its engagement.

The lever 89 is also adapted for a second function as follows: The short arm 88 of said lever, as seen in Figs. 3 and 4 lies under the weight arm 34 which through the stem 30 presses down the guide roll 31. When the lever 89 is lifted in order to throw the feed nut 24 into action, the short arm 88 of said lever is by this same movement lowered, thereby allowing the weight arm 34 to press down the guide roll 31 to its work; but when the lever 89 is depressed to throw the nut out of action, the short arm 88 lifts the weight arm 34, thereby lifting the guide roll out of action also. It will now be seen that when at the end of the operation, the nut 24 is thrown out of engagement with the feed screw, by the lever 89, the nut, together with the traveler 22 and guide roll 31 will be returned by the line 78 and descending weight 76. In order to effect the stoppage and return of these parts at any point in their operation, I provide for a manual control by means of a line 90, Fig. 4 connected with the trip arm 74 of the pawl 73, said line passing to a spring controlled pull button 91. Similarly, in order to stop the motor at any time during the operation, I have a manual control through a line 92 (Fig. 4) which is connected with the trip arm 84 of the pawl 82, said line being guided by pulleys 93 and 94 to a spring controlled pull rod 95 Figs. 1 and 2.

A complete description of the operation of the machine will now be given:

The mandrel 3 is adjusted by means of the cam rod 10 to the desired diameter and then the longitudinal wires A of the coil to be formed are laid in the grooves 5 of the mandrel sections 4. The number of these wires may be say, four, eight, or sixteen, as desired, and the placing of said wires may be conveniently done by rotating the mandrel by hand wheel 15 or by the pedal 16.

The helix wire which is on a drum in the proximity, is then passed under the guide roll 31, and is fastened. By operating the lever 89 the nut 24 of the traveler 22 is lifted to its engagement with the feed screw 23, and by this same movement of the lever 89, the stem 30 of the guide roll 31 is released and pressed down by the weighted arm 34, so that said guide-roll now rests firmly on the helix wire.

Current is now turned in to the motor at the switch 66. Then the lever 63 is operated to lift the motor 45 about its pivot 62, in order to close the primary circuit at 68 (Fig. 9) and said motor is held up and the circuit maintained by the ratchet and pawl 81 and 82, Fig. 4. Power is now transmitted from the motor through the friction gear train 44—43—42, 37 and 36 to the mandrel shaft 2 and the mandrel 3 is thereby rotated. By preliminarily manually adjusting the position of the friction pinions 42 and 37, due to releasing the set bolts 40 and sliding the bushing 39, the rate of rotation of the mandrel may be fixed as desired.

The rotation of the mandrel is now transmitted to the feed screw 23 through the friction gear train 36—46—50 and 51 and the position of the pinions 46 and 50 of this train is such that at first a slow rotation is given the feed screw. The traveler 22 now moves forward and its associated guide roll 31 carries the helix wire along and lays it up around the rotating mandrel and upon the longitudinal wires thereon in close turns due to the slow travel of the roll, to any number desired, say three. Now by operating the lever 58 the line 55 pulls the sliding bracket 49 over and changes the position of the pinions 46 and 50, thereby increasing the speed of the feed screw 23 to any rate desired to give the predetermined pitch to the helix wire. This rate is then maintained by holding the line 55 at the ratchet and pawl 72—73, Fig. 4.

Due to the induced electric current in the circuit 70, Fig. 9, and the timely making and breaking of this circuit by the switch contacts 59 on the mandrel shaft gear 36, and the opposing switch contact 61 (Fig. 4) a spot weld takes place through the guide-roll 31, at every crossing of the helix wire with the longitudinal wires.

By the proper adjustment of the contact 61 to engage any of the plural series of gear contacts 59, the spot welding effect is made to conform to the number of longitudinal wires on the mandrel.

During the travel of the guide roll 31 and the laying on of the helix wire the traveler 22 is lifting the weight 76. A few turns before the end of the mandrel is reached, the cam face 77 of the weight 76, by contact with the arm 74, trips the holding pawl 73 and by freeing the line 55 permits the spring 53 (Fig. 2) to pull the bracket 49 back to its first position. This movement of the bracket restores the slow speed position of the pinions 46 and 50 so that now the guide roll 31 moves slowly and thus lays up the few remaining turns of the helix wire close together, as at the beginning. When the end is reached, the weight 76, by means of its cam face 83 contacts with the arm 84, and trips the holding pawl 81, so that the line 64 is released, and the motor 45 drops down to open the circuit and stop rotation. Finally the lever 89 is reversed, to unlock the nut 24 from the feed screw, and to lift the guide roll 31, and thereupon the weight 76, descending pulls the nut traveler and roll back to initial position.

I claim:

1. A machine for making wire-coils comprising a mandrel adapted for carrying a circumferential series of longitudinal wires of the coil to be produced; a guide-roll to receive the circumferential wire of said coil and to hold it on the longitudinal wires; means for simultaneously rotating said mandrel and effecting the travel of the guide-roll longitudinally thereof, to helically lay said circumferential wire upon said longitudinal wires; and means for electrically spot-welding the circumferential wire and the longitudinal wires at each crossing.

2. A machine for making wire-coils comprising a mandrel adapted for carrying a circumferential series of longitudinal wires of the coil to be produced; a guide-roll to receive the circumferential wire of said coil and to hold it on the longitudinal wires; means for simultaneously rotating said mandrel and effecting the travel of the guide-roll longitudinally thereof to helically lay said circumferential wire upon said longitudinal wires; and means automatically operated by the rotation of the mandrel for electrically spot-welding the circumferential wire and the longitudinal wires at each crossing.

3. A machine for making wire-coils comprising a mandrel adapted for carrying a circumferential series of longitudinal wires of the coil to be produced; a guide roll to receive the circumferential wire of said coil and to hold it on the longitudinal wires; means for simultaneously rotating said mandrel and effecting the travel of the guide-roll longitudinally thereof to helically lay said circumferential wire upon said longitudinal wires; an electric circuit through said mandrel and guide-roll; and a make and break switch operated by the rotation of the mandrel and timed to close said circuit at each crossing of the longitudinal wires by the circumferential wire, to weld said wires at said crossings.

4. A machine for making wire coils comprising a mandrel having a series of longitudinal grooves in which to lay the longitudinal wires of the coil to be produced; a guide-roll to receive the circumferential wire of said coil and to hold it on the longitudinal wires lying in said grooves; means for simultaneously rotating said mandrel and effecting the travel of the guide-roll longitudinally thereof, to helically lay said circumferential wire upon said longitudinal wires; and means for electrically spot-welding said circumferential wire and said longitudinal wires at each crossing.

5. A machine for making wire-coils comprising a mandrel having a series of longitudinal grooves in which to lay the longitudinal wires of the coil to be produced; a guide-roll to receive the circumferential wire of said coil and to hold it on the longitudinal wires, lying in said grooves; means for simultaneously rotating said mandrel and effecting the travel of the guide-roll longitudinally thereof, to helically lay said circumferential wire upon said longitudinal wires; an electric circuit through said mandrel and guide roll; a make and break switch operated by the rotation of the mandrel and timed to close said circuit at each crossing of the longitudinal wires by the circumferential wire, to weld said wires at said crossings; and means for adjusting said switch to time its closing to conform to the number of longitudinal wires carried by the mandrel.

6. A machine for making wire-coils comprising a mandrel adapted for carrying a circumferential series of longitudinal wires of the coil to be produced; a guide-roll to receive the circumferential wire of said coil and to hold it on the longitudinal wires; means for rotating said mandrel; means for effecting the travel of the guide-roll longitudinally of the mandrel to helically lay said circumferential wire upon said longitudinal wires; means for varying the rate of travel of the guide-roll while laying up said circumferential wire, in order to vary the pitch of the helix; and means for electrically spot-welding the circumferential wire and the longitudinal wires at each crossing.

7. A machine for making wire-coils comprising a mandrel adapted for carrying a circumferential series of longitudinal wires of the coil to be produced; a guide-roll to receive the circumferential wire of said coil and to hold it on the longitudinal wires; means for rotating said mandrel; means for effecting the travel of the guide-roll longitudinally of the mandrel to helically lay said circumferential wire upon said longitudinal wires; and means for varying the rate of travel of the guide roll while laying up said circumferential wire, in order to vary the pitch of the helix, consisting of a train of friction gears between the mandrel and the travel effecting means of the guide-roll; and mechanism to change the speed ratios of said gears; and means for electrically spot-welding the circumferential wire and the longitudinal wires at each crossing.

8. A machine for making wire-coils comprising a mandrel adapted for carrying a circumferential series of longitudinal wires of the coil to be produced; a guide-roll to receive the circumferential wire of said coil and to hold it on the longitudinal wires; means for rotating the mandrel; a nut carrying said guide-roll; a feed screw for advancing the nut and effecting the travel of the guide-roll longitudinally of the mandrel to helically lay said circumferential wire upon said longitudinal wires; a train of friction gears between the mandrel and the feed screw; and means for changing the speed ratios of said gears to vary the pitch of the helix during the laying up of the circumferential wire, consisting of a sliding bracket for changing the relative positions of the friction gears in the train; a lever and connections for sliding the bracket in one direction and a spring for returning it.

9. A machine for making wire-coils comprising a mandrel adapted for carrying a circumferential series of longitudinal wires of the coil to be produced; a guide-roll to receive the circumferential wire of said coil and to hold it on the longitudinal wires; means for rotating the mandrel; a nut carrying said guide-roll; a feed screw for advancing the nut and effecting the travel of the guide-roll longitudinally of the mandrel to helically lay said circumferential wire upon said longitudinal wires; a train of friction gears between the mandrel and the feed screw; means for changing the speed ratios of said gears to vary the pitch of the helix during the laying up of the circumferential wire, consisting of a sliding bracket for changing the relative positions of the friction gears in the train; a lever and connections for sliding the bracket in one direction and a spring for returning it; means for holding the bracket when moved by the lever; and means operated by the travel of the guide-roll to trip said holding means to permit the spring to return the bracket.

10. A machine for making wire-coils comprising a mandrel adapted for carrying a circumferential series of longitudinal wires of the coil to be produced; a guide roll to receive the circumferential wire of said coil and to hold it on the longitudinal wires; means for rotating the mandrel; a nut carrying said guide-roll; a feed screw for advancing the nut and effecting the travel of the guide-roll longitudinally of the mandrel to helically lay said circumferential wire upon said longitudinal wires; a train of friction gears between the mandrel and the feed-screws; a sliding bracket for changing the relative speed ratios of said gears to vary the pitch of the helix during its winding; a lever and connections for sliding the bracket in one direction and a spring for returning it; means for holding the bracket when moved by the lever; a vertically movable weight lifted by the travel of the nut and guide roll and adapted to trip said bracket holding means to permit the spring to return the bracket; and means for disengaging the nut from the feed screw and lifting the guide-roll at the end of their travel, to permit the weight to return them to initial positions.

11. A machine for making wire-coils comprising a rotatable mandrel adapted for carrying a circumferential series of longitudinal wires of the coil to be produced; a guide-roll to receive the circumferential wire of said coil and to hold it on the longitudinal wires; a traveler carrying said roll; a nut carrying the traveler; a feed screw for advancing the nut; a friction gear for rotating the mandrel; a friction gear for rotating the feed screw; adjustable friction pinions between said gears for driving them and varying their speed ratios; an electric circuit including the mandrel and its driving gear and the traveler and its guide-roll; and a make and break switch for said circuit timed to close the same at each crossing of the longitudinal wires by the circumferential wire to spot-weld said wires together, consisting of contacts carried by the mandrel driving gear and an opposing contact with which the gear contacts successively make and break electrical connection.

12. A machine for making wire-coils comprising a rotatable mandrel adapted for carrying a circumferential series of longitudinal wires of the coil to be produced; a guide-roll to receive the circumferential wire of said coil and to hold it on the longitudinal wires; a traveler carrying said roll; a nut carrying the traveler; a feed screw for advancing the nut; a friction gear for rotating the mandrel; a friction gear for rotating the feed screw; adjustable friction pinions between said gears for driving them and varying their speed ratios; an electric circuit including the mandrel and its driving gear and the traveler and its guide-roll; a make and break switch for said circuit timed to close the same at each crossing of the longitudinal wires by the circumferential wire to spot weld said wires together, consisting of contacts carried by the mandrel driving gear and an opposing contact with which the gear contacts successively make an electrical connection; an electric motor; a train of friction gears from the motor to drive the friction gear of the mandrel; a primary electric circuit and a transformer by which the welding circuit is induced, and means for making and breaking said primary circuit by swinging the motor.

In testimony whereof I have signed my name to this specification in the presence of two subscribing witnesses.

JULIUS G. ZWICKER.

Witnesses:
 WM. F. BOOTH.
 D. B. RICHARDS.